Sept. 30, 1958 J. M. SMITH 2,853,724
FISHING GEAR FLOAT DEVICE
Filed July 16, 1957 2 Sheets-Sheet 1
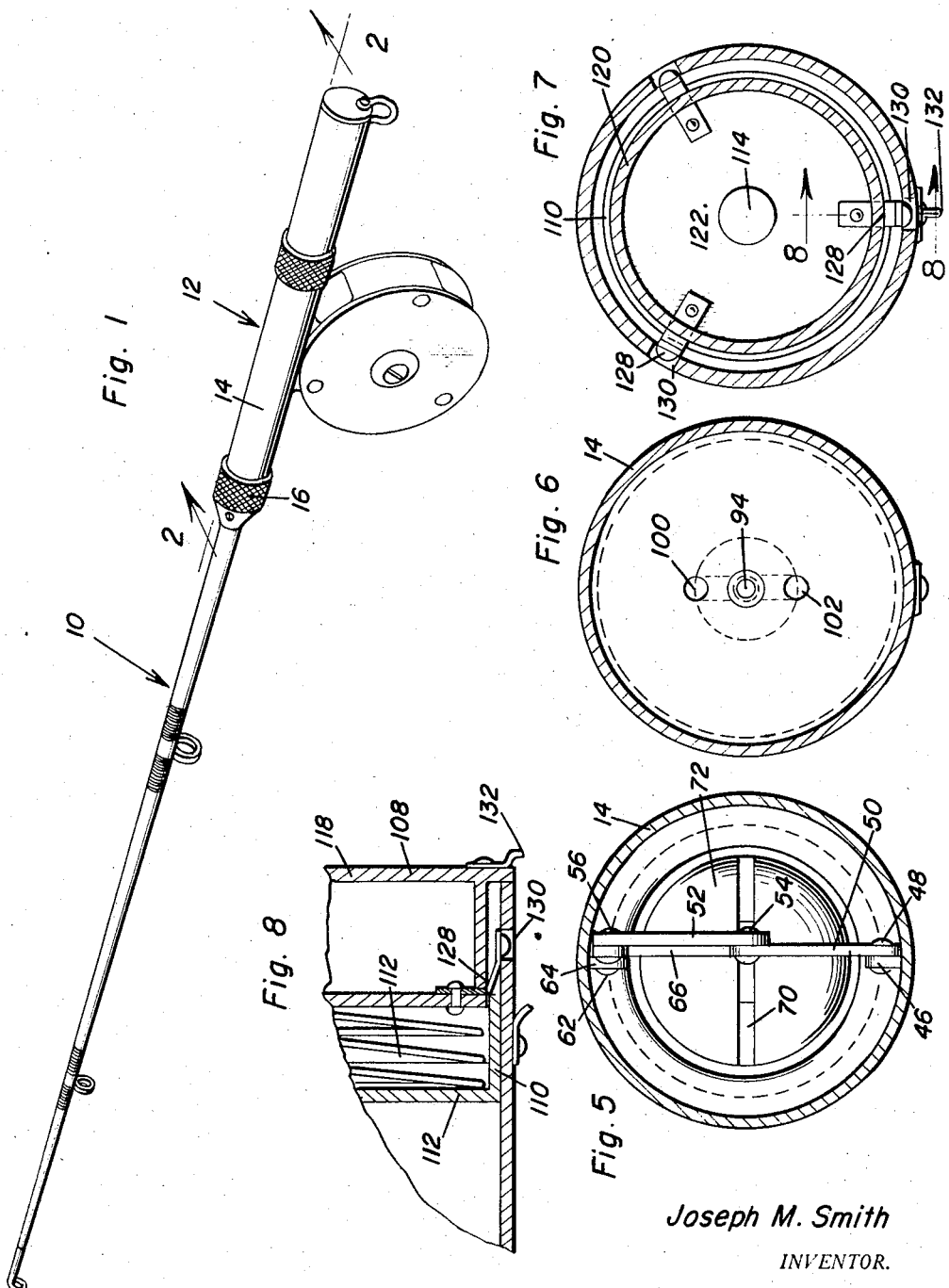
Joseph M. Smith
INVENTOR.

Sept. 30, 1958   J. M. SMITH   2,853,724
FISHING GEAR FLOAT DEVICE
Filed July 16, 1957   2 Sheets-Sheet 2
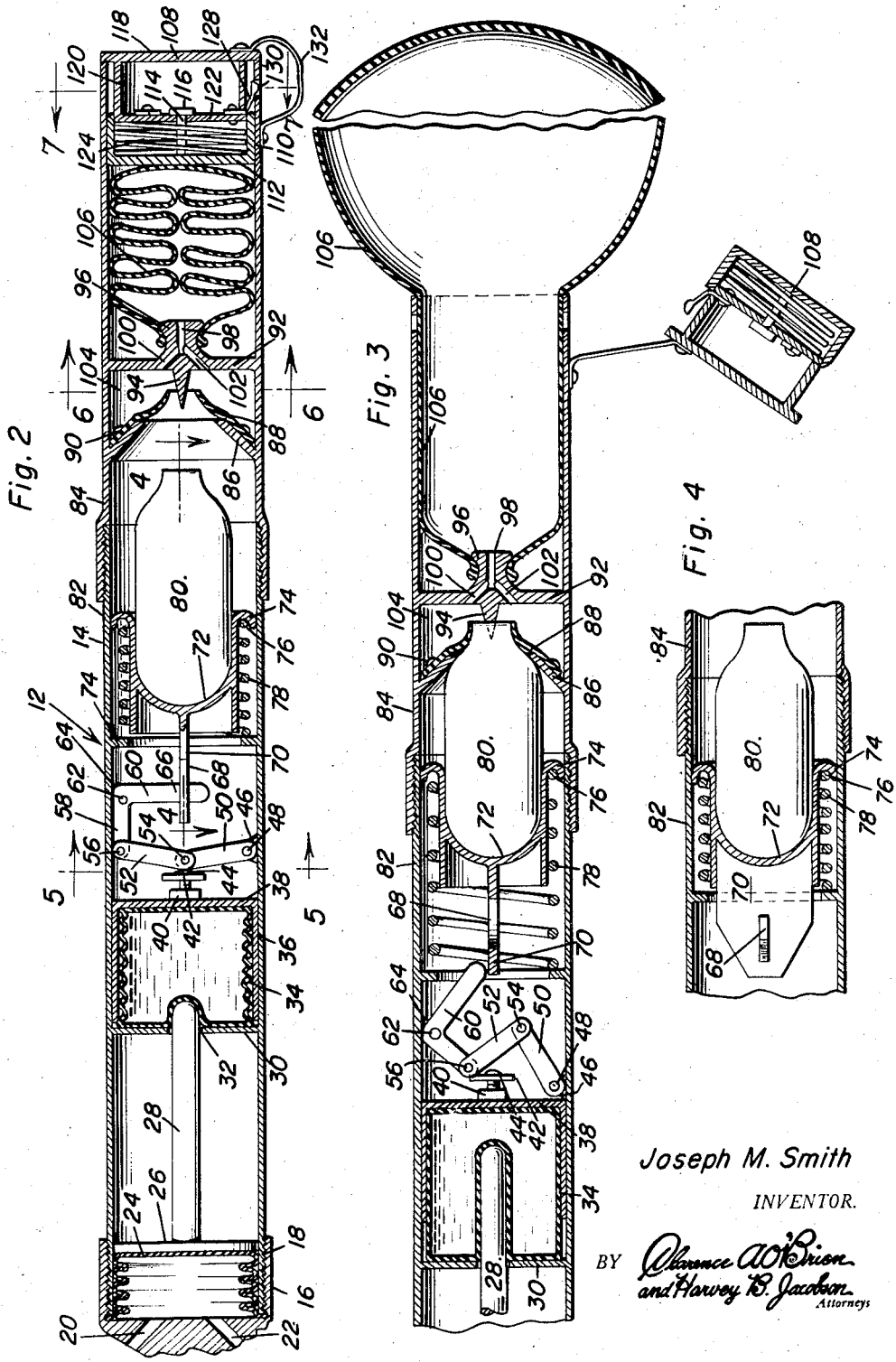
Joseph M. Smith
INVENTOR.

United States Patent Office 2,853,724
Patented Sept. 30, 1958

2,853,724

FISHING GEAR FLOAT DEVICE

Joseph M. Smith, Tacoma, Wash., assignor of one-third to Anzo Grazzini, Spanaway, Wash.

Application July 16, 1957, Serial No. 672,172

6 Claims. (Cl. 9—9)

This invention relates to a float device for floating an inadvertently submerged object and more particularly to a device adapted to be attached to various types of equipment such as fishing rods, etc. so that if these devices are inadvertently dropped overboard they will be floated for aiding in the recovery thereof.

The primary object of the present invention resides in the provision of novel means for inflating a balloon type float when an object is dropped overboard to a depth where the water pressure is sufficient to actuate a release mechanism carrying a gas filled container against a piercing means so that the gas from the container can inflate the balloon.

Still further objects and features of this invention reside in the provision of an apparatus for floating an inadvertently submerged object that is simple in construction, effective in use, capable of being readily affixed to various types of objects such as fishing rods, guns, outboard motors or the like by means of a convenient adapter, and which is substantially foolproof in use.

These, together with the various ancillary objects and features of the invention which will become apparent as the following description proceeds, are attained by this float device for floating an inadvertently submerged object, a preferred embodiment of which has been illustrated in the accompanying drawings, by way of example only, wherein:

Figure 1 is a perspective view of the invention shown in use as a portion of a fishing rod;

Figure 2 is a longitudinal sectional view in an enlarged scale as taken along the plane of line 2—2 in Figure 1;

Figure 3 is a sectional detail view showing a portion of the invention after the gas container has been pierced;

Figure 4 is a partial sectional view as taken along the plane of line 4—4 in Figure 2 illustrating the carriage for the gas container;

Figure 5 is a transverse sectional view as taken along the plane of line 5—5 in Figure 2 illustrating in particular the construction of the latching means;

Figure 6 is a transverse sectional view as taken along the plane of line 6—6 in Figure 2 illustrating the construction of the piercing means and passageways in the partition carrying the piercing means;

Figure 7 is a sectional detail view as taken along the plane of line 7—7 in Figure 2 illustrating in particular the cap; and Figure 8 is an enlarged sectional view as taken along the plane of line 8—8 in Figure 7

With continuing reference to the accompanying drawings wherein like numerals designate similar parts throughout the various views, reference numeral 10 is used to generally designate a fishing pole employing the device for floating an inadvertently submerged object generally indicated by reference numeral 12 and comprising the present invention. This device includes a tube 14 together with a threaded adapter 16 which is used to threadedly secure the invention 12 on the rest of the fishing rod. Of course, the invention may be equally adaptable for guns, outboard motors, various types of tools, etc. The adapter is internally threaded as at 18 for threaded engagement on the externally threaded end of the tube 14 and has inlet openings as at 20 and 22 therethrough for communication to the interior of the tube.

Mounted within the tube 14 is an expandable bellows type seal 24 formed of a resilient material and having a plate 26 attached thereto to which a plunger 28 is affixed.

Positioned in the tube 14 abutting the partition 30 and bonded thereto if desired is a hydraulic capsule 34 of a suitable elastic material. The capsule 34 is adapted to be filled with a hydraulic fluid. A cylinder 36 having a closed wall 38 is disposed in the tube 14 and the elastic hydraulic capsule is positioned between the cylinder 36 and the partition 30. Hence, when the plunger 28 is driven into the elastic hydraulic capsule 34, the cylinder 36 is moved moving the end wall 38. Threadedly adjustably secured to a block 40 on the end wall 38 is an adjustment screw 42 having an engaging head 44.

A boss 46 is welded or otherwise secured to the tube 14 and has pivotally secured thereto as at 48 the link 50 to which a link 52 is pivotally secured as at 54. The head 44 of the adjusting screw 42 is adapted to abut the links 50 and 52. The link 52 is pivotally secured as at 56 to an arm 58 of a crank 60 pivoted as at 62 to a boss 64 on the cylinder 14. The crank 60 has an arm 66 thereof which extends into a slot 68, see Figure 4, of a latching plate 70 which is attached to a concave carriage 72. The plate 70 extends through a second partition 74 in the tube 14. The carriage has an arcuate flange 74 in which is engaged one end 76 of a spring 78 which also engages the partition 74 to continuously urge the carriage 72 and the gas container 80 carried thereby away from the partition 74. The gas container 80 is of conventional construction and may be readily replaced after the gas tube has been expanded.

The tube 14 is formed in two sections as at 82 and 84 which are threadedly detachably secured to each other for easy replacement of the gas container 80 and for facilitating the construction of the invention.

Affixed to the tube section 84 of the tube 14 is a funnel 86 having a resilient rebound ring of a truncated conical shape as indicated at 88 affixed thereto as by rivets 90 or other suitable fastening means. There is a partition 92 adjacent the rebound ring 88 and carried thereby is a piercing member or point 94 which extends within the confines of the ring 88. Hence, when the carriage 72 is actuated and the gas container 80 propelled against the point 94, it will be pierced allowing gas to escape. It is noted that the end of the rebound ring 88 is sealed by the presence of the gas container 80 while the gas container is caused to rebound slightly off of the point 94 by the resilient construction of the rebound ring 88.

Secured to the partition 92 or integrally formed therewith and forming a part thereof is a nozzle 96 having an outlet 98 and having passageways as at 100 and 102 communicating the space 104 with the nozzle outlet 98 so that gas passing from the gas container 80 or cartridge will be directed through the nozzle into a balloon 106 formed of rubber or other suitable inflatable material.

In order to hold the balloon 106 in position until it has been expanded there is provided a novel cap 108 which includes a cylindrical member 110 having an end wall 112 against which the balloon 106 bears to which there is attached a stud 114 carrying a plate 116. Affixed to the end wall 118 of the cap is a cylinder 120 of smaller dimensions than the cylinder 110 and slidable therein. The cylinder has an end plate 122 affixed thereto and biasing the end wall 112 and the plate 122 is a spring 124. The stud 114 extends through a suitable aperture in the plate 122 and carried by the plate 102 are latches as at 128 which are enageable within openings 130 formed in the tube 14.

In use, as the balloon 106 expands, the cylinder 110 is moved compressing the spring 124 and causing the cylinder 110 to engage the latches 128 to raise the latches out of the openings 130 thus allowing the balloon to push the cap out of the tube. In order to hold the cap against loss, a suitable tie device as at 132 may be provided.

The operation of this invention is quite simple. Should the fishing rod be inadvertently lost overboard, the fishing rod will sink. When the water pressure due to the depth of the water becomes sufficient so that it causes the expandable seal 24 to move the plunger 28 through the opening 32 and from the position as is shown in Figure 2 to the position as is shown in Figure 3, the adjustable screw 42 will be carried into a position to move the links 50 and 52 past dead center position as shown in Figure 2 to the position as is shown in Figure 3 releasing the latching plate 70 and allowing the spring 78 which was under compression to move the carriage 72 causing the gas container or cartridge 80 to be driven into piercing engagement with the piercing point 94. The rebound effect caused by the rebound ring 88 permits the gas to escape and pass through the openings 102 into the balloon and the balloon will then expand outwardly of the tube occupying sufficient volume to refloat the fishing rod.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A float device for floating an inadvertently submerged object comprising a tube having an adapter secured to one end thereof for connection to the object to be floated, an expandable seal in said tube, said adapter having inlet openings therethrough communicating with said expandable seal, a plunger secured to said expandable seal and movable thereby, a first partition in said tube having an aperture therethrough through which said plunger extends, a hydraulic cylinder in said tube, an elastic hydraulic capsule between said cylinder and said first partition, said plunger extending into said elastic hydraulic cylinder, a second partition in said tube, a gas container in said tube, a carriage mounted in said tube receiving said gas container, a spring biasing said carriage and said second partition, latching means actuated by said hydraulic cylinder engageable with said carriage to retain said carriage against movement with said spring under compression, a third partition in said tube having a nozzle attached thereto, piercing means on said third partition, said third partition having a passageway therethrough communicating with said nozzle, said gas container engaging said piercing means to permit contacts of said gas container to pass through said passageway on said nozzle, a balloon on said nozzle, and a cap detachably secured to said tube urged by said balloon when inflated from said tube.

2. A float device for floating an inadvertently submerged object comprising a tube having an adapter secured to one end thereof for connection to the object to be floated, an expandable seal in said tube, said adapter having inlet openings therethrough communicating with said expandable seal, a plunger secured to said expandable seal and movable thereby, a first partition in said tube having an aperture therethrough through which said plunger extends, a hydraulic cylinder in said tube, an elastic hydraulic capsule between said cylinder and said first partition, said plunger extending into said elastic hydraulic cylinder, a second partition in said tube, a gas container in said tube, a carriage mounted in said tube receiving said gas container, a spring biasing said carriage and said second partition, latching means actuated by said hydraulic cylinder engageable with said carriage to retain said carriage against movement with said spring under compression, a third partition in said tube having a nozzle attached thereto, piercing means on said third partition, said third partition having a passageway therethrough communicating with said nozzle, said gas container engaging said piercing means to permit contacts of said gas container to pass through said passageway on said nozzle, a balloon on said nozzle, and a cap detachably secured to said tube urged by said balloon when inflated from said tube, said latching means including a latching plate secured to said carriage and extending through said second partition, said latching plate having a slot therein, a crank pivoted to said tube and having an arm extending into said slot, a first link pivoted to said tube, and a second link pivoted to said first link and to said crank.

3. A float device for floating an inadvertently submerged object comprising a tube having an adapter secured to one end thereof for connection to the object to be floated, an expandable seal in said tube, said adapter having inlet openings therethrough communicating with said expandable seal, a plunger secured to said expandable seal and movable thereby, a first partition in said tube having an aperture therethrough through which said plunger extends, a hydraulic cylinder in said tube, an elastic hydraulic capsule between said cylinder and said first partition, said plunger extending into said elastic hydraulic cylinder, a second partition in said tube, a gas container in said tube, a carriage mounted in said tube receiving said gas container, a spring biasing said carriage and said second partition, latching means actuated by said hydraulic cylinder engageable with said carriage to retain said carriage against movement with said spring under compression, a third partition in said tube having a nozzle attached thereto, piercing means on said third partition, said third partition having a passageway therethrough communicating with said nozzle, said gas container engaging said piercing means to permit contacts of said gas container to pass through said passageway on said nozzle, a balloon on said nozzle, and a cap detachably secured to said tube urged by said balloon when inflated from said tube, said latching means including a latching plate secured to said carriage and extending through said second partition, said latching plate having a slot therein, a crank pivoted to said tube and having an arm extending into said slot, a first link pivoted to said tube, and a second link pivoted to said first link and to said crank, an adjustment screw adjustably secured to said hydraulic cylinder, said adjustment screw abutting said first link and said second link.

4. A float device for floating an inadvertently submerged object comprising a tube having an adapter secured to one end thereof for connection to the object to be floated, an expandable seal in said tube, said adapter having inlet openings therethrough communicating with said expandable seal, a plunger secured to said expandable seal and movable thereby, a first partition in said tube having an aperture therethrough through which said plunger extends, a hydraulic cylinder in said tube, an elastic hydraulic capsule between said cylinder and said first partition, said plunger extending into said elastic hydraulic cylinder, a second partition in said tube, a gas container in said tube, a carriage mounted in said tube receiving said gas container, a spring biasing said carriage and said second partition, latching means actuated by said hydraulic cylinder engageable with said carriage to retain said carriage against movement with said spring under compression, a third partition in said tube having a nozzle attached thereto, piercing means on said third partition, said third partition having a passageway therethrough communicating with said nozzle, said gas container engaging said piercing means to permit contacts of said gas container to pass through said passageway on said nozzle, a balloon on said nozzle, and a cap detachably secured to said tube urged by said balloon when inflated from said tube, a funnel secured to said tube between said gas container and said third partition, and a resilient rebound ring and seal secured to said funnel for resilient engagement with said gas container.

5. A float device for floating an inadvertently submerged object comprising a tube having an adapter secured to one end thereof for connection to the object to be floated, an expandable seal in said tube, said adapter having inlet openings therethrough communicating with said expandable seal, a plunger secured to said expandable seal and movable thereby, a first partition in said tube having an aperture therethrough through which said plunger extends, a hydraulic cylinder in said tube, an elastic hydraulic capsule between said cylinder and said first partition, said plunger extending into said elastic hydraulic cylinder, a second partition in said tube, a gas container in said tube, a carriage mounted in said tube receiving said gas container, a spring biasing said carriage and said second partition, latching means actuated by said hydraulic cylinder engageable with said carriage to retain said carriage against movement with said spring under compression, a third partition in said tube having a nozzle attached thereto, piercing means on said third partition, said third partition having a passageway therethrough communicating with said nozzle, said gas container engaging said piercing means to permit contacts of said gas container to pass through said passageway on said nozzle, a balloon on said nozzle, and a cap detachably secured to said tube urged by said balloon when inflated from said tube, a funnel secured to said tube between said gas container and said third partition, and a resilient rebound ring and seal secured to said funnel for resilient engagement with said gas container, said latching means including a latching plate secured to said carriage and extending through said second partition, said latching plate having a slot therein, a crank pivoted to said tube and having an arm extending into said slot, a first link pivoted to said tube, and a second link pivoted to said first link and to said crank.

6. A float device for floating an inadvertently submerged object comprising a tube having an adapter secured to one end thereof for connection to the object to be floated, an expandable seal in said tube, said adapter having inlet openings therethrough communicating with said expandable seal, a plunger secured to said expandable seal and movable thereby, a first partition in said tube having an aperture therethrough through which said plunger extends, a hydraulic cylinder in said tube, an elastic hydraulic capsule between said cylinder and said first partition, said plunger extending into said elastic hydraulic cylinder, a second partition in said tube, a gas container in said tube, a carriage mounted in said tube receiving said gas container, a spring biasing said carriage and said second partition, latching means actuated by said hydraulic cylinder engageable with said carriage to retain said carriage against movement with said spring under compression, a third partition in said tube having a nozzle attached thereto, piercing means on said third partition, said third partition having a passageway therethrough communicating with said nozzle, said gas container engaging said piercing means to permit contacts of said gas container to pass through said passageway on said nozzle, a balloon on said nozzle, and a cap detachably secured to said tube urged by said balloon when inflated from said tube, a funnel secured to said tube between said gas container and said third partition, and a resilient rebound ring and seal secured to said funnel for resilient engagement with said gas container, said latching means including a latching plate secured to said carriage and extending through said second partition, said latching plate having a slot therein, a crank pivoted to said tube and having an arm extending into said slot, a first link pivoted to said tube, and a second link pivoted to said first link and to said crank, an adjustment screw adjustably secured to said hydraulic cylinder, said adjustment screw abutting said first link and said second link.

References Cited in the file of this patent

UNITED STATES PATENTS

| | | |
|---|---|---|
| 2,687,541 | Bannister | Aug. 31, 1954 |
| 2,752,615 | Parker | July 3, 1956 |
| 2,821,725 | Harper | Feb. 4, 1958 |